3,253,635
PNEUMATIC TIRE CASINGS
Georges Louis Travers, Clermont-Ferrand, Puy-de-Dome, France, assignor to Compagnie Generale des Etablissements Michelin, raison social Michelin & Cie, Clermont-Ferrand, Puy-de-Dome, France
Filed Apr. 8, 1964, Ser. No. 358,300
Claims priority, application France, Apr. 12, 1963, 931,561
17 Claims. (Cl. 152—354)

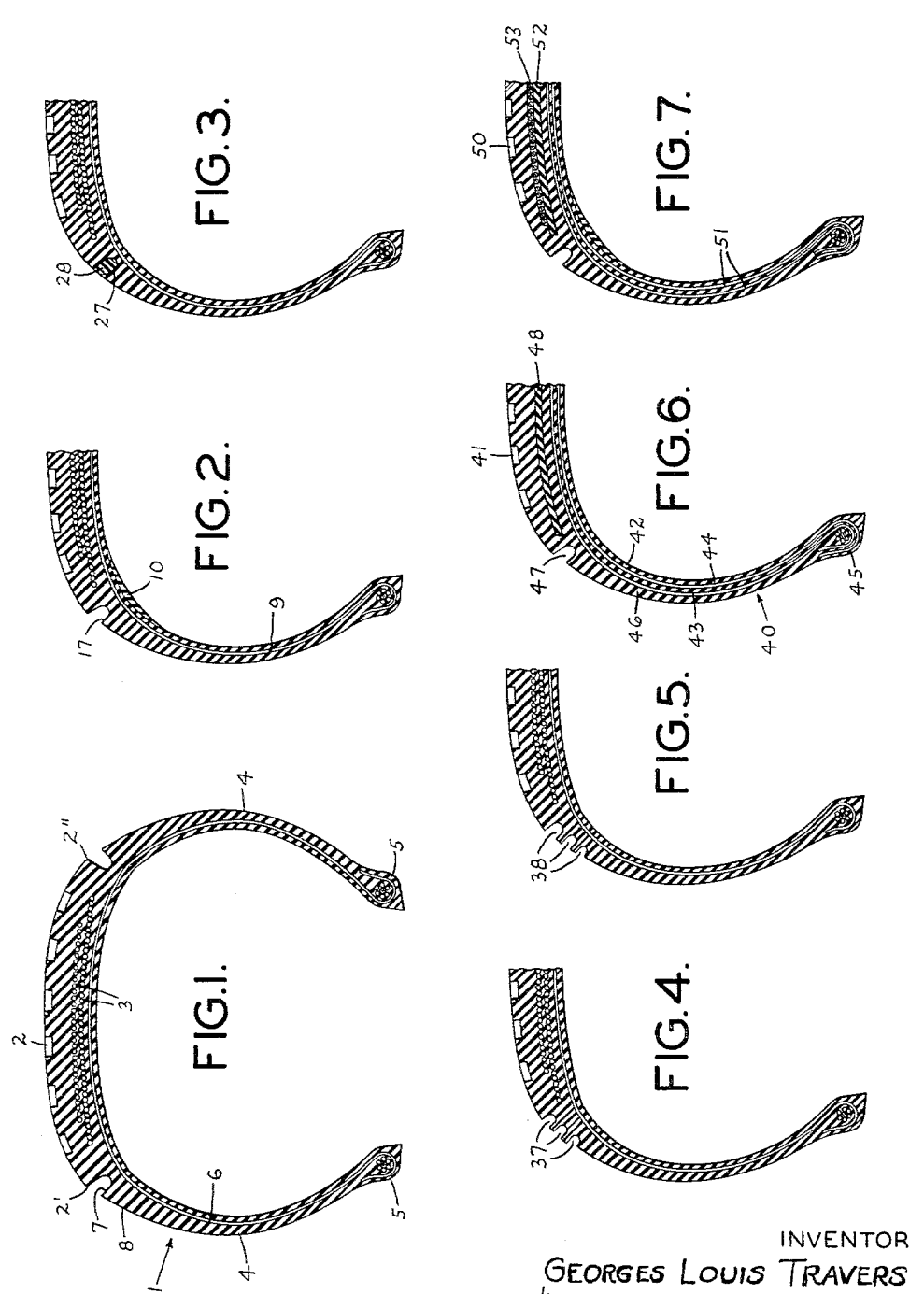

This invention relates to tubeless and tube-type tire casings for vehicle wheels, and especially to tire casings which require a lesser amount of energy to propel a vehicle equipped with the new tire casings under a given load at a given speed.

It is known that part of the energy supplied a tire in the course of rolling develops heat in the mass of the elastomer constituting the casing. The heat, in addition to resulting in useless energy consumption has a harmful effect and breaks down the elastomer, and this will happen at a speed which is in direct proportion to the temperature to which the elastomer is subjected. Therefore, it is important, and constitutes the principal object of the present invention, to provide tire casing structures which limit the amonut of energy converted into heat and reduce the amount of power required to propel a vehicle equipped with the tire casings.

Various measures have been proposed in the past in order to counteract internal heating.

Some of these consist essentially in providing some means of ventilation and cooling on the outer surface of the tire, such as incisions or air circulation channels increasing the surface area exposed to contact with the air.

Other measures are directed to limitation of internal heating in the tread by avoiding the presence of unduly thick sections of rubber with a high hysteretic loss. Actually, the generation of heat increases in direct proportion to the mass of the elastomer employed and it is helpful to avoid an excess of material in the tread or to provide a number of incisions in the surface of the tread so as to limit the effect of internal friction.

In accordance with the present invention, excessive heating and dissipation of energy are avoided by preventing or reducing interactions between the side-walls, tread and carcass ply or plies of the casing. By reducing or eliminating these interactions, a large number of the properties of the tire are greatly improved, namely, decreased rolling effort, improved road-holding abiilty or "cornering power," higher speed limit, greater resistance to wear and tear, and reduced weight at equal service and use conditions.

It is known that, as a tire rolls, it is subjected to internal periodic oscillations or actions maintained by the energy which is communicated to it. An oscillating system is thus formed by a tire casing. Since the parts which make up a tire casing do not behave alike, this oscillating system must be considered as being composed of two or more oscillating systems which are coupled to and react with one another. In a tire casing, one of the systems is the tread and the other system to which the tread is coupled is the sidewall and the underlying carcass. The energy which is dissipated in the casing comprises the energy disseminated in each of the two systems and, in addition, the energy of coupling of these two systems with each other. Calculations show and experience confirms that the energy of coupling represents a considerable proportion of the dissipated energy which, under cetrain conditions, may be as much as 50% of the dissipated energy.

The present invention is based on the principle that decoupling the oscillating system composed of the tread, on the one hand, and the sidewalls and the carcass adjacent and underneath the tread, on the other hand, reduces the energy dissipated in the tire and, at the same time, the internal heating and the power required for rolling the tire. In tires embodying the invention, the tread and the carcass, altough connected, behave substantially as if they were independent of one another and the transmission of periodical effects from one system to the other thus is reduced or eliminated.

In order to obtain decoupling between the tread and the sidewall in accordance with the invention, a zone for interrupting the coupling is provided in each sidewall of the tire. The decoupling zone has an elasticity which is greatly different from that of the surrounding parts of the tire casing.

More particularly, the zone of interruption may be an incision in the sidewalls, for example, a groove running around the outer circumference of the sidewall, which makes it possible to interpose cushioning means in the sidewall. The groove may be open or closed. A similar effect is obtained by introducing into the groove a soft elastomer, a material which is cellular or alveolar, or any other similar material which is not rigid and follows the movement of the elastomer constituting the sidewalls without, however, transmitting substantial energy to the tread.

The interruption in the sidewalls may be reinforced to advantage by adding to the elastic connection between the sidewall and the tread a reinforcement on the inside of the casing which will have the advantage of compensating for the weakening of the sidewalls by the presence of the groove or grooves.

Uncoupling between the sidewalls and the tread is further aided by providing means for uncoupling the tread and the portion of the carcass adjoining and underneath the tread. Such an uncoupling means is especially helpful with, but is not limited to, tires having crossed or bias-laid carcass plies.

More particularly, the means for uncoupling the tread and the underlying carcass may include a layer which has an elasticity different from the elasticity of the adjacent portions of the carcass and tread. In accordance with one form of the invention, the intermediate layer has an elasticity higher than the elasticity of the adjacent layers. Such layer may consist for example of a soft elastomer, such as soft rubber, synethetic rubber, elastomeric synthetic plastic, or the like.

In another form of the invention, a layer may be provided having lower elasticity, for example, a semi-rigid layer, the rigidity of which may be increased still further by inclusion of metallic or non-metallic cables, cords, filaments and the like. Such a layer by its inertia constitutes a screen against the transmission of forces. In these two embodiments of the invention, the sliding of the tread composition when passing within the ellipse of contact is limited whereby the road-holding ability and wear and tear are improved.

The several forms of the invention can be combined as, for example, by placing between the tread and the carcass, soft and hard (rigid or semi-rigid) layers, together with a heterogeneous intermediate layer either in radial direction or in transversal direction or also in both directions.

Inasmuch as uncoupling of the oscillating system composed of the tread, sidewalls and carcass renders each element independent of the actions of the other element, the casing structure can be reduced in weight and/or thickness to take into account the decrease in fatigue. Consequently, the weight of the tire suitable for a given service can be reduced or the tire can be used under conditions, especially of higher speed, involving greater stresses.

Various examples shall now be described with reference to the accompanying drawings, in which FIGURE 1 represents a radial cross-section of a tire casing, the carcass of which consists of wires or cords arranged radially, i.e., in planes passing through the axis of rolling of the wheel;

FIGURES 2 to 5 are partial cross-sectional views of modified forms of the casings embodying the invention; and FIGURES 6 and 7 are radial half-sectional views of a tire casing embodying the invention, the carcass of which consists of crossed wire or cord plies.

As shown in FIGURE 1, a typical tire casing 1 comprises a tread 2, the surface of contact of which extends from 2' to 2" containing a reinforcement constituted by cords 3. The two sidewalls 4, each ending in a bead 5, contain a carcass 6 consisting of radial cords running from one bead to the other passing underneath the reinforcement of the tread. FIGURE 1 shows only one continuous carcass ply 6. However, the carcass can be reinforced by one interrupted ply or several plies which may be either continuous or interrupted. On both sides of the casing, a groove 7 running around the circumference extends from the outer wall 8 of the sidewall 4 inwardly adjacent to the carcass 6 and substantially perpendicular to the latter.

In accordance with the invention, the groove 7 acts to uncouple the oscillating system composed of the tread 2 and the reinforcement 3, on the one hand, and the sidewalls 4, on the other hand.

The groove 7 is formed in any suitable way, such as by molding or removal of material.

The depth of the groove 7 must be sufficient to provide good uncoupling effectiveness. If $l$ is the thickness of the rubber above the carcass ply (or the outermost carcass ply), i.e., the distance between the ply and the outer surface of the sidewall measured perpendicular to the sidewall at the groove, and if $e$ is the depth of the groove measured in the same manner, effective uncoupling will be obtained if $e$ is at least one-fourth of $l$. The effectiveness of uncoupling increases in direct proportion to the relationship of $e/l$. In practice, good results will be obtained by leaving underneath the carcass ply a thickness of rubber which equals the thickness of the rubber in the thinnest part of the sidewall, at least in tires such as the one shown in FIGURE 1 in which the thickness of sidewalls is not uniform and is reduced at mid-height to the minimum necessary for a protection of the carcass. Therefore, it will be of interest to have the largest possible ratio $e/l$ (up to 0.9) which is compatible with the protection of the carcass. A value of around 0.5 produces very satisfactory results.

In order to improve uncoupling between the sidewalls 4 and the tread 2, provided by the groove 7, and, furthermore, to avoid excessive fatigue of the carcass at right angles with the groove, it is, in accordance with the invention, advantageous to provide a reinforcement of the carcass in that region either by positioning a layer of rubber, preferably hard rubber, inwardly of the carcass, or by arranging in the carcass in the region of the groove 7 one or more narrow supplementary plies formed of wires or cords which run on the bias and which are embedded in the elastomer. It is also possible to reinforce this area of the casing by using in or between the carcass plies one or several films of a harder or less resilient elastomer having a modulus of elasticity between about 250 and 500 grs. per square mm. at 100% elongation, so as not to substantially reduce the ratio $e/l$.

The width of the groove 7 should be sufficient so that on compression of the tire under normal conditions of use, especially of inflation, load and drift, the lips of the groove should not come in contact with each other. A width measured at the outer surface 8 of the sidewall between about 3.5 mm. and 10 mm. for passenger car tires and between about 4.5 mm. and 15 mm. for heavy load tires, furnishes the best results. In case the carcass is reinforced at right angle to the groove, as described above, the width of the groove may be decreased. The groove 7 is directed inwardly substantially perpendicular to the carcass plies in order to facilitate formation thereof.

The shape of the groove may be varied considerably. However, it should not be too open as this might weaken the sidewall, or, if the groove is placed against the tread, make the shoulder of the tread weak. The bottom of the groove preferably should be rounded rather than angular to avoid splitting of the rubber at the bottom of the groove. Also, an open groove should have a cross-section or shape, e.g., slightly outwardly diverging, to avoid retaining of foreign matter therein.

The groove should be located between mid-height (middle) of the tire, i.e., at the height at which the torus is of maximum width, and the tread and outside that zone of the sidewall which may come into contact with the ground while rolling without drift or with very slight drift. Optimum results are obtained by locating the groove in the upper third of the zone between mid-height of the sidewall and the ground-contacting portion of the tread. Any of the area between mid-height and tread will, however, be suitable, especially if a reinforcement of the carcass is provided at a right angle to the groove. The essential aspect is the uncoupling of the tread and the sidewalls to prevent them from forming an oscillating system.

While the groove 7 may be continuous around the circumference of the casing, thin transverse partitions may be provided. Moreover, the groove in the direction of the circumference may be different from circular but disposed between two concentric circles, for example, a wavy or zigzag groove.

The presence of a groove 7 in the sidewalls of a tire casing having a radial carcass of the kind shown in FIGURE 1 produces a considerable decrease of the power required to roll the tire casing and the temperature developed in the tread during rolling. The result varies with the dimension of the tire under consideration, its conditions of use and especially its speed. For example, a 165–380 mm. tire not having grooves 7 in its sidewalls carrying a load of 400 kg., inflated to 1.8 kg./cm.$^2$, requires a thrust of 15.7 kg./ton of load at 100 km./h. for rolling. The same tire requires a thrust of 13.8 kg./ton of load when provided with a groove having a ratio $e/l$ close to 0.35 and 13.6 kg. with a groove having a ratio $e/l$ close to 0.55. The corresponding tread temperatures with conditions maintained constant are, respectively, 86° C., 77° C. and 75° C. A reduction of the rolling or advancing effort of the order of approximately 15% and a decrease in temperature of the order of about ten degrees are thus obtained by the provision of a groove 7 in each sidewall of the tire.

FIGURE 2 shows a modified form of tire casing wherein a reinforcement of the carcass 9 is shown in form of an extra thickness of rubber 10 placed underneath the carcass ply at right angles to the groove 17.

FIGURE 3 represents another form of the invention shown in FIGURE 1 wherein the groove 7 of FIGURE 1 is replaced by a closed channel 27.

In accordance with the invention, the channel 27 may be filled either with air or with a very elastic material 28, for example, a soft elastomer, a foam plastic or rubber or the like. In the case of a soft elastomer, to obtain the best results the elastomer should have a modulus of elasticity which equals between about 5% and 70% of the modulus of the elastomer surrounding the channel 27. A suitable elastomer 28 has a modulus between about 5 and 140 gr./mm.$^2$ at 100% elongation where used with sidewall compositions having a modulus between about 100 and 200 gr./mm.$^2$ at 100% of elongation.

In FIGURES 4 and 5, the casing is provided with a plurality of grooves 37 having the same depth (FIGURE 4), or grooves 38 having different depths (FIGURE 5). These grooves are equivalent of a single groove, the width of which is substantially the sum of the widths of the grooves 37 and 38, its depth being their average depth.

In FIGURE 6, the tire casing 40 includes a tread 41 and a carcass 42 of the crossed or bias-laid type having, in this case, two plies 43 and 44 of cords which run parallel in each ply but which are inclined in different directions. These plies 43 and 44 extend from one bead 45 to the other (not shown) passing underneath the tread. Each sidewall 46 is uncoupled from the tread 41 by means of a circumferential groove 47 of the type described above.

As shown in FIGURE 6, a layer 48 of an elastomer extends around the casing between the tread 41 and the carcass 42. The elastomer 48 has an elasticity which is substantially different from that of the elastomer which constitutes the tread and is either higher or lower than it. The layer 48, in accordance with the invention, uncouples the oscillating system composed of the tread 41 and the carcass 42 just as the groove 7 uncouples the sidewall 4 and tread 2 in the casing disclosed in FIGURE 1.

In order to obtain the best results, the width of the layer 48 should be at least one-half of the width of the tread, and its thickness should be between about 0.3 mm. and 5 mm. for passenger car tires, between about 1 mm. and 10 mm. for giant tires and between 2 mm. and 20 mm. for earthmover tires. Particularly good results are obtained if the layer 48 extends over a width of between three-quarters and the full width of the tread and if such layer has a thickness of about 1 to 3 mm. for passenger car tires, 2 to 6 mm. for giant tires and 3 to 12 mm. for earthmover tires.

The effectiveness of uncoupling is directly related to the modulus of elasticity of the elastomer forming the tread and the layer 48. If M is the modulus of elasticity of the most rigid elastomer, $M(1-a)$ is that of the least rigid elastomer. $a$ which is between 0 and 1 is the efficiency factor of uncoupling, which factor should be as close to 1 as possible. Satisfactory results have been obtained for a value $a$ of about 0.3. The layer 48 can be made more rigid than the tread elastomer by using a hard or high modulus elastomer or by embedding rigidifying elements such as wires, cords, thin lamina, etc. in the elastomer, or a combination of them.

The layer 48 does not have to be homogeneous over its entire width. For example, it may be heterogeneous layer composed of two lateral bands of soft elastomer and a harder or more rigid center band of hard elastomer comprising, if desired, a reinforcement in the form of wires, cords, cables, etc., referred to hereinafter generally as "cords."

As shown in FIGURE 7, between the tread 50 and the carcass 51 are arranged, one above the other, a layer 52 of elastomer, the elasticity of which is much higher than the elasticity of the tread, and above the layer 52 a crown ply 53 consisting of cords. This form of the invention enables maximum uncoupling of the tread and carcass due to simultaneous inclusion of all of the uncoupling means disclosed separately in FIGURES 1, 2 and 6. The uncoupling of the oscillatory system is at its greatest when the layer 52 extends substantially from one sidewall to the other and if one or more crown ply or plies are provided in the tread outside of the layer 52.

The tires with radial carcass plies such as shown in FIGURE 1 also may have internal oscillations minimized by including a soft rubber layer between the carcass and the tread.

The following table shows the results of tests made with tires embodying the present invention. The advancing effort in kgs. of thrust per ton of load is given at different speeds for different types of tires having the same dimensions (165 x 380) used under the same conditions (load of 475 kg., pressure 1.8 kg./cm.$^2$).

| Speed in km./h. | 80 | 100 | 115 | 130 | 145 | 100 |
|---|---|---|---|---|---|---|
| | Advancing effort in kg./t. | | | | | Temperature in ° C. |
| Pneumatic Tire: | | | | | | |
| A | 11.5 | 11.65 | 12 | 12.6 | 13.05 | 75 |
| B | 12.3 | 12.25 | 12.15 | 12.75 | 13.05 | 73 |
| C | 11.9 | 12.2 | 11.9 | 12.7 | 13.5 | 72 |
| D | 11.6 | 11.6 | 11.65 | 11.8 | 12 | 71 |
| E | 10.35 | 10.35 | 10.62 | 10.60 | 10.65 | 70 |
| T | 13.5 | 13 | 13.35 | 13.72 | 14.5 | 73 |
| T' | 16.8 | 17 | 17.2 | 17.5 | 18 | 82 |

The five tires A, B, C, D and E were provided with a groove running around the circumference in each of the sidewalls. The transverse cross-sections and the geometric characteristics of the groove are those shown in FIGURES 1, 6 and 7. The tires differ from one another in the following characteristics.

Tire A has a carcass of four crossed textile plies. Uncoupling between the carcass and the tread is assured solely by the interposition of a layer of soft rubber, the thickness of which is approximately 3 mm. and the modulus of elasticity, i.e., 120 gr./mm.$^2$ at 100% elongation, which is approximately 65% of that of the rubber of the tread.

Tire B has the above-described soft rubber layer and an additional crown ply of metal cords above the soft rubber layer.

Tires C, D and E have a carcass composed of two crossed (bias) textile plies. Uncoupling between the carcass and the tread is obtained by means of a soft rubber layer as in tires A and B, topped in case C by a crown ply of metal cords, and in cases D and E by means of two crown plies of metal cords. In the tire E, uncoupling between the tread and the sidewall is furthermore supplemented by the addition of a layer of hard rubber, i.e., having a modulus of 500 gr./mm.$^2$ at 100% elongation, placed underneath the carcass and covering the region of the groove, as shown in FIGURE 2.

The control tire T is a conventional tire with radial carcass plies and a tread reinforced by three metal cable crown plies.

The control tire T' is a conventional tire with four crossed textile plies. However, in order not to distort comparison, it was molded to render it identical to the other tires.

As may be seen, the advancing effort and the temperature are improved by uncoupling the oscillation systems of the tire, and the improvement increases as uncoupling becomes more complete. This improvement is particularly noticeable in comparison with the control tire T which is a tire recognized as having relatively low resistance to rolling. In comparison to the control tire T', the improvement is even greater.

In addition to the decrease in resistance to rolling, uncoupling increases road-holding ability. The following table furnishes the elements for comparison between tires E, T and T'.

| Drift in degrees | 2° | 4° |
|---|---|---|
| Lateral realignment power in kg: | | |
| Tire E | 126 | 220 |
| Tire T | 136 | 210 |
| Tire T' | 97 | 180 |

This shows that the tire E is comparable to the tire T, and is even superior to it for high angles of drift. It is considerably superior to tire T'.

The foregoing examples of tire casings embodying the invention are susceptible to considerable modification in their sizes, carcass, sidewall and tread structures, and accordingly the examples given should be considered as illustrative.

I claim:
1. In a pneumatic tire casing having a carcass, beads at opposite edges of said carcass, a tread of elastomeric material overlying said carcass and extending circumferentially thereof and having lateral edges united with said carcass, sidewalls of elastomeric material overlying said carcass between said beads and the corresponding edges of said tread and merging with said lateral edges of said tread, said tread, carcass and sidewalls forming each an oscillating system when rolling; the combination therewith of means for uncoupling the oscillating system formed by said tread and the oscillating systems formed by said sidewalls and said carcass, comprising a zone in each sidewall and extending circumferentially thereof between about the middle of said sidewall and the adjacent lateral edge of said tread where the thickness of the elastomeric material of the sidewalls is substantially reduced and at least one layer of reinforcing material between said carcass and said tread, said layer having less resiliency than said tread and said carcass.

2. The pneumatic tire casing set forth in claim 1 in which the elasticity of said zone is less than 70% of the elasticity of said side wall material on each side thereof.

3. The pneumatic tire casing set forth in claim 1 comprising a reinforcing member disposed inwardly of said carcass and substantially perpendicular to and extending over said zone.

4. The pneumatic tire casing set forth in claim 1 in which said zone of interruption comprises a plurality of grooves having a maximum depth between about one-quarter and nine-tenths of the thickness of said side wall at said zone.

5. The pneumatic tire casing set forth in claim 1 in which said zone comprises at least one groove having a depth between about one-quarter and nine-tenths of the thickness of the side wall at said zone.

6. The pneumatic tire casing set forth in claim 5 in which said groove has a rounded inner end spaced from said carcass a distance not less than the thickness of said side wall at the middle of said sidewall.

7. The pneumatic tire casing set forth in claim 5 in which said groove has sides substantially perpendicular to said carcass at said zone and said groove has at the outer surface of said sidewall an open side between about 3.5 and 10 mm. wide for a passenger car tire and between about 4.5 mm. and 15 mm. wide for a giant tire.

8. The pneumatic tire casing set forth in claim 5 comprising an elastomer in and substantially filling said groove, said elastomer having a modulus of elasticity less than 70% of the modulus of elasticity of the sidewall material.

9. In a pneumatic tire casing having a carcass, beads at opposite edges of said carcass, a tread of elastomeric material overlying said carcass and extending circumferentially thereof and having its lateral edges united with said carcass, sidewalls of elastomeric material overlying said carcass between said beads and the corresponding edges of said tread and merging into said edges, said tread, carcass and sidewalls forming each an oscillating system when rolling; the combination therewith of a zone of interruption in each sidewall and extending circumferentially thereof between about the middle of said sidewall and the adjacent edge of said tread, said zone having an elasticity different from the elasticity of said sidewall material and said tread material, and a layer of an elastomeric material extending circumferentially of said casing between said tread and said carcass, said layer having a modulus of elasticity different from said tread material and said carcass and having a width of at least 50% of said tread.

10. The tire casing set forth in claim 9 in which said layer is between about 0.3 mm. and 5.0 mm. thick for a passenger car tire, between 1 mm. and 10 mm. thick for a giant tire and between 2 mm. and 20 mm. thick for earth-mover tires.

11. The tire casing set forth in claim 9 in which said layer has a modulus of elasticity not exceeding 70% of the modulus of elasticity of said tread material.

12. The tire casing set forth in claim 9 in which said layer has a modulus of elasticity of at least 10/7 of the modulus of said tread material.

13. The tire casing set forth in claim 9 in which said layer contains at least one ply of reinforcing cords.

14. The tire casing set forth in claim 9 comprising a layer of elastomer having a modulus of elasticity not exceeding 70% of the modulus of said tread material and an adjacent layer having a modulus not less than 10/7 of the modulus of said tread material.

15. The tire casing set forth in claim 9 comprising a layer of elastomer having a modulus of elasticity not exceeding 70% of the modulus of said tread material and an adjacent layer containing at least one ply of reinforcing cords.

16. The tire casing set forth in claim 9 in which said layer comprises a central portion and lateral portions on opposite sides of said central portion, said lateral portions having a modulus of elasticity less than said tread material and said central portion having a modulus greater than said tread material.

17. The pneumatic tire casing set forth in claim 9, in which said zone of interruption comprises at least one groove having a depth between about one-quarter and nine-tenths of the thickness of the sidewall at said zone.

References Cited by the Examiner

UNITED STATES PATENTS

| | | | |
|---|---|---|---|
| 1,428,817 | 9/1922 | Swan | 152—209 |
| 2,303,164 | 11/1942 | Hawkinson | 152—153 |
| 2,452,998 | 11/1948 | Cuthbertson | 152—354 |
| 2,760,541 | 8/1956 | Reifenberger | 152—153 |
| 2,844,181 | 7/1958 | Riggs et al. | 152—354 |
| 2,958,360 | 11/1960 | Macklem et al. | 152—354 |
| 3,118,482 | 1/1964 | Beissner | 152—354 |

FOREIGN PATENTS

| | | |
|---|---|---|
| 4,915 | 1909 | Great Britain. |
| 1,059,542 | 7/1952 | France. |

ARTHUR L. LA POINT, *Primary Examiner.*

C. W. HAEFELE, *Assistant Examiner.*